(12) United States Patent
Zha

(10) Patent No.: US 12,202,602 B2
(45) Date of Patent: Jan. 21, 2025

(54) FLUID SYSTEMS HAVING A VARIABLE CONFIGURATION

(71) Applicant: COFLOW JET, LLC, Cutler Bay, FL (US)

(72) Inventor: Gecheng Zha, Cutler Bay, FL (US)

(73) Assignee: COFLOW JET, LLC, Cutler Bay, FL (US)

( * ) Notice: Subject to any disclaimer, the term of this patent is extended or adjusted under 35 U.S.C. 154(b) by 0 days.

(21) Appl. No.: 18/010,016

(22) PCT Filed: Jun. 1, 2021

(86) PCT No.: PCT/US2021/035115
§ 371 (c)(1),
(2) Date: Dec. 13, 2022

(87) PCT Pub. No.: WO2021/257271
PCT Pub. Date: Dec. 23, 2021

(65) Prior Publication Data
US 2024/0010325 A1    Jan. 11, 2024

Related U.S. Application Data

(60) Provisional application No. 63/040,045, filed on Jun. 17, 2020.

(51) Int. Cl.
*B64C 3/48* (2006.01)
*B64C 3/50* (2006.01)
(Continued)

(52) U.S. Cl.
CPC . *B64C 3/50* (2013.01); *B64C 9/18* (2013.01)

(58) Field of Classification Search
CPC ....... B64C 3/44; B64C 2003/445; B64C 3/48; B64C 3/50
See application file for complete search history.

(56) References Cited

U.S. PATENT DOCUMENTS 1,580,577 A   4/1926  Karl
1,714,608 A   5/1929  Massey
(Continued)

FOREIGN PATENT DOCUMENTS

CA    3045209 A1    6/2018
CN    104176241     12/2014
(Continued)

OTHER PUBLICATIONS

Great Britain Patent Act 1977: Examination Report under Section 18(3), Application No. GB2200772.8, dated Jul. 27, 2023.
(Continued)

*Primary Examiner* — Brian M O'Hara
(74) *Attorney, Agent, or Firm* — MacMillan, Sobanski & Todd, LLC

(57) ABSTRACT

Fluid systems are described. An example fluid system includes a body and a housing. The body has a leading edge, a trailing edge, a first portion, and a second portion attached to the first portion. The second portion is moveable relative to the first portion between a first position and a second position. The housing extends from the first portion to the second portion and is configured to move as the second portion moves relative to the first portion. The housing is moveable between a first configuration and a second configuration. The housing is in the first configuration when the second portion is in the first position and is in the second configuration when the second portion is in the second position. The housing has a first length when in the first configuration and a second length when in the second configuration that is greater than the first length.

19 Claims, 7 Drawing Sheets

(51) Int. Cl.
  *B64C 9/18*  (2006.01)
  *B64C 9/28*  (2006.01)

(56) References Cited

U.S. PATENT DOCUMENTS

| | | |
|---|---|---|
| 1,771,257 A | 7/1930 | Ingram |
| 1,772,196 A | 8/1930 | Wallace |
| 1,806,927 A | 5/1931 | Benjamin |
| 1,810,693 A | 6/1931 | Alfaro |
| 1,829,616 A | 10/1931 | Stalker |
| 1,845,307 A | 2/1932 | Maxwell |
| 1,861,336 A | 5/1932 | Cox |
| 1,888,871 A | 11/1932 | Apperman |
| 1,993,419 A | 3/1935 | Stalker |
| 2,039,676 A | 5/1936 | Zaparka |
| 2,041,795 A | 5/1936 | Stalker |
| 2,063,030 A | 12/1936 | Rupert |
| 2,071,744 A | 2/1937 | Anathor-Henrikson |
| 2,075,817 A | 4/1937 | Loerke |
| 2,077,071 A | 4/1937 | Rose |
| 2,078,854 A | 4/1937 | Jones |
| 2,082,674 A | 6/1937 | Young |
| 2,219,234 A | 10/1940 | Messerschmitt |
| 2,223,744 A | 12/1940 | Stalker |
| 2,225,525 A | 12/1940 | Pitcairn |
| 2,267,927 A | 12/1941 | Kightlinger |
| 2,352,144 A | 6/1944 | Woods |
| 2,377,386 A | 6/1945 | Stalker |
| 2,406,918 A | 9/1946 | Stalker |
| 2,421,694 A | 6/1947 | Hawkins |
| 2,427,972 A | 9/1947 | Melchior |
| 2,438,942 A | 4/1948 | Polk |
| 2,464,726 A | 3/1949 | Stalker |
| 2,469,902 A * | 5/1949 | Stalker .................. B64C 21/025 244/208 |
| 2,478,793 A | 8/1949 | Serge |
| 2,507,611 A | 5/1950 | Pappas |
| 2,511,504 A | 6/1950 | Hawkins |
| 2,514,513 A | 7/1950 | Price |
| 2,584,666 A | 2/1952 | Bockrath |
| 2,585,676 A | 2/1952 | Poisson-Quinton |
| 2,597,769 A | 5/1952 | Ashkenas |
| 2,605,983 A | 8/1952 | Stalker |
| 2,619,302 A | 11/1952 | Loedding |
| 2,714,495 A | 8/1955 | Focke |
| 2,734,701 A | 2/1956 | Horton |
| 2,809,793 A | 10/1957 | Warner |
| 2,841,344 A | 7/1958 | Stroukoff |
| 2,873,931 A | 2/1959 | Fleischmann |
| 2,892,582 A | 6/1959 | O'Rourke |
| 2,910,254 A | 10/1959 | Razak |
| 2,941,751 A | 6/1960 | Gagarin |
| 2,946,541 A | 7/1960 | Boyd |
| 2,961,192 A | 11/1960 | Macaulay |
| 2,966,028 A | 12/1960 | Johnson et al. |
| 3,011,762 A | 12/1961 | Pouit |
| 3,029,043 A | 4/1962 | Churchill |
| 3,029,044 A | 4/1962 | Childress |
| 3,032,977 A | 5/1962 | Neitzel |
| 3,039,719 A | 6/1962 | Platt |
| 3,045,947 A | 7/1962 | Bertin |
| 3,055,614 A | 9/1962 | Thompson |
| 3,085,740 A | 4/1963 | Wagner |
| 3,097,817 A | 7/1963 | Towzey, Jr. |
| 3,101,678 A | 8/1963 | Grube |
| 3,128,037 A | 4/1964 | McClellan |
| 3,128,063 A | 4/1964 | Kaplan |
| 3,128,364 A | 4/1964 | Wanttaja |
| 3,144,220 A | 8/1964 | Kittelson |
| 3,161,377 A | 12/1964 | Balluff |
| 3,191,820 A | 6/1965 | Kuster |
| 3,193,215 A | 7/1965 | Dunham |
| 3,251,319 A | 5/1966 | Kaupert |
| 3,261,576 A | 7/1966 | Valyi |
| 3,262,658 A | 7/1966 | Reilly |
| 3,291,420 A | 12/1966 | Laing |
| 3,298,636 A | 1/1967 | Arnholdt |
| 3,302,903 A | 2/1967 | Hanus |
| 3,417,767 A | 12/1968 | Young |
| 3,430,894 A | 3/1969 | Torstein |
| 3,438,599 A | 4/1969 | Welzen |
| 3,441,236 A | 4/1969 | Arnholdt |
| 3,478,987 A | 11/1969 | Dorand |
| 3,506,220 A | 4/1970 | Sbrilli |
| 3,507,463 A | 4/1970 | Kuntz |
| 3,525,486 A | 8/1970 | Wimpenny |
| 3,540,681 A | 11/1970 | Orazi |
| 3,545,701 A | 12/1970 | Bertin |
| 3,572,612 A | 3/1971 | Irbitis |
| 3,576,300 A | 4/1971 | Palfreyman |
| 3,586,267 A | 6/1971 | Ingelman-Sundberg |
| 3,658,279 A | 4/1972 | Robertson |
| 3,666,209 A | 5/1972 | Taylor |
| 3,719,428 A | 3/1973 | Dettmering |
| 3,726,084 A | 4/1973 | Meier |
| 3,807,663 A | 4/1974 | Bartoe |
| 3,887,146 A | 6/1975 | Bright |
| 3,917,193 A | 11/1975 | Runnels, Jr. |
| 3,977,629 A | 8/1976 | Tubeuf |
| 4,033,526 A | 7/1977 | Benson |
| 4,086,022 A | 4/1978 | Freeman |
| 4,117,995 A | 10/1978 | Runge |
| 4,169,567 A | 10/1979 | Tamura |
| 4,214,722 A | 7/1980 | Tamura |
| 4,258,889 A | 3/1981 | Hunt |
| 4,285,482 A | 8/1981 | Lewis |
| 4,375,937 A | 3/1983 | Cooper |
| 4,375,938 A | 3/1983 | Dussourd |
| 4,381,091 A | 4/1983 | Pegram |
| 4,391,424 A | 7/1983 | Bartoe, Jr. |
| 4,398,683 A | 8/1983 | Schmetzer |
| 4,398,688 A | 8/1983 | Williams |
| 4,519,563 A | 5/1985 | Tamura |
| 4,630,997 A | 12/1986 | Cousteau et al. |
| 4,710,101 A | 12/1987 | Jamieson |
| 4,771,602 A | 9/1988 | Ruiz |
| 4,804,155 A | 2/1989 | Strumbos |
| 4,813,631 A | 3/1989 | Gratzer |
| 4,828,203 A | 5/1989 | Clifton |
| 4,848,701 A | 7/1989 | Belloso |
| 4,928,907 A | 5/1990 | Zuck |
| 4,976,349 A | 12/1990 | Adkins |
| 4,990,053 A | 2/1991 | Rohne |
| 5,016,837 A | 5/1991 | Willis |
| 5,098,034 A | 3/1992 | Lendriet |
| 5,255,881 A | 10/1993 | Rao |
| 5,280,863 A | 1/1994 | Schmittle |
| 5,282,718 A | 2/1994 | Koff |
| 5,289,848 A | 3/1994 | Jenisch, Jr. |
| 5,308,225 A | 5/1994 | Koff |
| 5,335,885 A | 8/1994 | Bohning |
| 5,395,073 A | 3/1995 | Rutan |
| 5,474,417 A | 12/1995 | Privett |
| 5,542,149 A | 8/1996 | Yu |
| 5,586,859 A | 12/1996 | Nolcheff |
| 5,607,284 A | 3/1997 | Byrne |
| 5,687,934 A | 11/1997 | Owens |
| 5,687,937 A | 11/1997 | Habib |
| 5,707,206 A | 1/1998 | Goto |
| 5,765,777 A | 6/1998 | Schmittle |
| 5,769,359 A | 6/1998 | Rutan |
| 5,899,416 A | 5/1999 | Meister |
| 6,068,446 A | 5/2000 | Tangler et al. |
| 6,089,503 A | 7/2000 | Volk |
| 6,119,987 A | 9/2000 | Kiknadze |
| 6,220,012 B1 | 4/2001 | Hauser |
| 6,231,301 B1 | 5/2001 | Barnett |
| 6,264,425 B1 | 7/2001 | Keller |
| 6,368,059 B1 | 4/2002 | Maines |
| 6,464,171 B2 | 10/2002 | Ruffin |
| 6,543,720 B2 | 4/2003 | Ladd |
| 6,585,479 B2 | 7/2003 | Torrance |
| 6,669,142 B2 | 12/2003 | Saiz |
| 6,796,533 B2 | 9/2004 | Barrett |

(56) References Cited

U.S. PATENT DOCUMENTS

| | | |
|---|---|---|
| 6,817,308 B1 | 11/2004 | Miller |
| 6,896,221 B1 | 5/2005 | Einarsson |
| 6,923,403 B1 | 8/2005 | Dizdarevic |
| 6,935,833 B2 | 8/2005 | Seitz |
| 7,074,006 B1 | 7/2006 | Hathaway |
| 7,104,143 B1 | 9/2006 | Powell |
| 7,143,983 B2 | 12/2006 | McClure |
| 7,308,762 B2 | 12/2007 | Bath |
| 7,354,247 B2 | 4/2008 | Bonnet |
| 7,435,057 B2 | 10/2008 | Parera |
| 7,441,724 B2 | 10/2008 | Parks |
| 7,520,465 B2 | 4/2009 | Mahjoub |
| 7,530,533 B2 * | 5/2009 | Perez-Sanchez ......... B64C 3/48 244/219 |
| 7,575,412 B2 | 8/2009 | Seitz |
| 7,673,832 B2 | 3/2010 | Meister |
| 7,837,438 B2 | 11/2010 | Campbell |
| 7,878,458 B2 | 2/2011 | Shmilovich |
| 8,128,037 B2 | 3/2012 | Powell |
| 8,128,364 B2 | 3/2012 | Pesetsky |
| 8,191,820 B1 | 6/2012 | Westra |
| 8,245,976 B2 | 8/2012 | Sakurai |
| 8,246,311 B2 | 8/2012 | Pesetsky |
| 8,251,317 B2 | 8/2012 | Pitt |
| 8,251,319 B2 | 8/2012 | Jonker |
| 8,262,031 B2 | 9/2012 | Zha |
| 8,302,903 B2 | 11/2012 | Morgan |
| 8,303,250 B2 | 11/2012 | Mohammed et al. |
| 8,444,383 B1 | 5/2013 | Baker |
| 8,448,892 B2 | 5/2013 | Zhu |
| 8,459,597 B2 | 6/2013 | Cloft |
| 8,469,907 B2 | 6/2013 | Ichihashi |
| 8,485,476 B2 | 7/2013 | Zha |
| 8,561,935 B2 | 10/2013 | Milde, Jr. |
| 8,807,940 B2 | 8/2014 | Grabau |
| 8,829,706 B1 | 9/2014 | Sammy |
| 8,932,024 B2 | 1/2015 | Hayashi |
| 9,079,657 B2 * | 7/2015 | Frey ......................... B64C 9/16 |
| 9,115,594 B2 | 8/2015 | Krautheim |
| 9,133,819 B2 | 9/2015 | Zuteck |
| 9,205,912 B2 | 12/2015 | McMurray |
| 9,611,865 B2 | 4/2017 | Morel |
| 9,726,084 B2 | 8/2017 | Duong |
| 9,815,545 B1 | 11/2017 | Steer |
| 9,822,792 B2 | 11/2017 | Guemmer |
| 9,862,480 B2 | 1/2018 | Brakes |
| 10,106,246 B2 | 10/2018 | Zha |
| 10,252,789 B2 | 4/2019 | Zha |
| 10,315,754 B2 | 6/2019 | Zha |
| 10,371,121 B1 | 8/2019 | Alhussan |
| 10,683,076 B2 | 6/2020 | Zha |
| 10,683,077 B2 | 6/2020 | Zha |
| 10,724,435 B2 | 7/2020 | Kroger |
| 10,815,886 B2 | 10/2020 | Kroger |
| 11,034,430 B2 | 6/2021 | Zha |
| 2002/0139894 A1 | 10/2002 | Sorensen |
| 2002/0195526 A1 | 12/2002 | Barrett |
| 2003/0035715 A1 | 2/2003 | Torrance |
| 2003/0150962 A1 | 8/2003 | Orban |
| 2004/0003471 A1 | 1/2004 | VanSteenburg |
| 2005/0111968 A1 | 5/2005 | Apworth |
| 2005/0152775 A1 | 7/2005 | Japikse |
| 2005/0226717 A1 | 10/2005 | Liping |
| 2006/0102801 A1 | 5/2006 | Manley |
| 2006/0196633 A1 | 9/2006 | Mahjoub |
| 2006/0219847 A1 | 10/2006 | Miller et al. |
| 2007/0095970 A1 | 5/2007 | Richardson |
| 2007/0196204 A1 | 8/2007 | Seitz |
| 2007/0217902 A1 | 9/2007 | Sirakov |
| 2007/0221788 A1 | 9/2007 | Meister |
| 2007/0228222 A1 | 10/2007 | Davis |
| 2008/0044273 A1 | 2/2008 | Khalid |
| 2009/0014592 A1 | 1/2009 | Zha |
| 2009/0065631 A1 | 3/2009 | Zha |
| 2009/0095446 A1 | 4/2009 | Hamstra |
| 2009/0108141 A1 | 4/2009 | Shmilovich |
| 2009/0169394 A1 | 7/2009 | Crow et al. |
| 2009/0173834 A1 | 7/2009 | Prince |
| 2009/0263234 A1 | 10/2009 | Yin |
| 2010/0104436 A1 | 4/2010 | Herr |
| 2010/0127129 A1 | 5/2010 | Zha |
| 2010/0135795 A1 | 6/2010 | Nies |
| 2010/0143121 A1 | 6/2010 | Haans |
| 2010/0143122 A1 | 6/2010 | Nies |
| 2010/0303634 A1 | 12/2010 | Long |
| 2011/0001000 A1 | 1/2011 | Zhu |
| 2011/0001020 A1 | 1/2011 | Forgac |
| 2011/0044796 A1 | 2/2011 | Hussain |
| 2011/0103950 A1 | 5/2011 | Pesetsky |
| 2011/0103952 A1 | 5/2011 | Pesetsky |
| 2011/0103953 A1 | 5/2011 | Haans |
| 2011/0103963 A1 | 5/2011 | Bendel et al. |
| 2011/0142638 A1 | 6/2011 | McGrath |
| 2011/0206506 A1 | 8/2011 | Nies |
| 2011/0206507 A1 | 8/2011 | Bhaisora et al. |
| 2011/0206531 A1 | 8/2011 | Kroo |
| 2011/0210211 A1 | 9/2011 | Zha |
| 2011/0215172 A1 | 9/2011 | Todorovic |
| 2011/0229322 A1 | 9/2011 | Tadayon |
| 2011/0229329 A1 | 9/2011 | Occhipinti |
| 2012/0043428 A1 | 2/2012 | Goelling |
| 2012/0068020 A1 | 3/2012 | Milde, Jr. |
| 2012/0074264 A1 | 3/2012 | Heaton |
| 2012/0082562 A1 | 4/2012 | Kotler |
| 2012/0145834 A1 | 6/2012 | Morgan |
| 2012/0237341 A1 | 9/2012 | Simon |
| 2012/0301296 A1 | 11/2012 | Greenblatt |
| 2013/0206920 A1 | 8/2013 | Bichler |
| 2013/0266436 A1 | 10/2013 | Ibaraki |
| 2014/0286746 A1 | 9/2014 | Nichols |
| 2014/0286787 A1 | 9/2014 | Philpsen |
| 2014/0369812 A1 | 12/2014 | Caruel |
| 2016/0009374 A1 | 1/2016 | Glezer |
| 2016/0010652 A1 | 1/2016 | Lim |
| 2016/0040654 A1 | 2/2016 | Cuoghi et al. |
| 2016/0368339 A1 | 12/2016 | Nam |
| 2017/0033451 A1 | 2/2017 | Lim |
| 2017/0137116 A1 | 5/2017 | Ireland |
| 2017/0159667 A1 | 6/2017 | Streit |
| 2017/0211545 A1 | 7/2017 | Saddoughi |
| 2017/0355450 A1 | 12/2017 | Zha |
| 2017/0355451 A1 | 12/2017 | Zha |
| 2018/0251211 A1 | 9/2018 | Zha |
| 2018/0363676 A1 | 12/2018 | Kroger |
| 2018/0363677 A1 | 12/2018 | Kroger |
| 2019/0127042 A1 | 5/2019 | Zha |
| 2019/0226350 A1 | 7/2019 | Zha |
| 2019/0389588 A1 | 12/2019 | Zha |
| 2020/0115019 A1 | 4/2020 | Malpede et al. |
| 2021/0284319 A1 | 9/2021 | Zha |
| 2022/0177097 A1 | 6/2022 | Bermudez et al. |
| 2022/0307462 A1 | 9/2022 | Zha |
| 2024/0018903 A1 | 1/2024 | Joret et al. |

FOREIGN PATENT DOCUMENTS

| | | |
|---|---|---|
| CN | 104149967 B | 5/2015 |
| CN | 111734577 | 10/2020 |
| DE | 10328540 | 2/2008 |
| DE | 202011051844 U1 | 11/2011 |
| EP | 2320076 A2 | 5/2011 |
| EP | 2333317 A2 | 6/2011 |
| EP | 2469076 A2 | 6/2012 |
| EP | 3254961 A1 | 12/2017 |
| EP | 3498596 | 6/2019 |
| FR | 3035861 A1 | 11/2016 |
| GB | 2564884 | 1/2019 |
| JP | 2013137006 | 7/2013 |
| KR | 20140029849 | 3/2014 |
| WO | 2007035758 A1 | 3/2007 |
| WO | 2018095496 A1 | 5/2018 |

(56) References Cited

FOREIGN PATENT DOCUMENTS

| WO | 2020165663 A1 | 8/2020 |
|----|---------------|--------|
| WO | 2021158106 A1 | 8/2021 |

OTHER PUBLICATIONS

PCT International Preliminary Report on Patentability, Application No. PCT/US2020/043022, dated Sep. 29, 2020.
European Communication pursuant to Article 94(3) EPC, Application No. 18202156.8, dated Apr. 14, 2022.
International Search Report and Written Opinion, Application No. PCT/IB2020/050373, dated May 6, 2020.
Antcliff et al., "Baseline Assumptions and Future Research Areas for Urban Air Mobility Vehicles", AIAA SciTech Forum, (2019), pp. 1-18.
USPTO, Non-Final Office Action, U.S. Appl. No. 17/854,499, dated Oct. 4, 2023.
PCT International Preliminary Report on Patentability, Application No. PCT/US2022/021540, mailed Oct. 5, 2023.
International Preliminary Report on Patentability, Application No. PCT/US2022/035707, mailed Jan. 11, 2024.
USPTO, Final Office Action, U.S. Appl. No. 17/702,351, dated Jan. 16, 2024.
Great Britain Patents Act 1977: Examination Report under Section 18(3), Application No. GB2200772.8, dated Oct. 27, 2023.
European Communication pursuant to Article 94(3), Application No. 18202156.8, dated Nov. 16, 2023.
Ren, "Simulation of 3D Co-Flow Jet Airfoil with Embedded Micro-Compressor Actuator", AIAA SciTech Forum, (2018), pp. 1-17, retrieved from the internet, URL: https://acfdlab.miami.edu/publications/aiaa-2018-0330.pdf.
Zha, "Super-Lift and Thrusting Airfoil of Coflow Jet Actuated by Micro-Compressors", AIAA Aviation Forum, (2018), pp. 1-17, retrieved from the internet, URL: https://acfdlab.miami.edu/publications/aiaa-paper-2018-3061.pdf.
European Communication pursuant to Rule 114(2), Third Party Observation for Application No. EP20180202156, dated Nov. 13, 2023.
USPTO, Non-Final Office Action, U.S. Appl. No. 17/702,351, dated Jul. 17, 2023.
USPTO, Non-Final Office Action, U.S. Appl. No. 17/628,258, dated Aug. 17, 2023.
"Fundamentals of Gas Turbine Engines" 2012; https://web.archive.org/web/20120905202602/https://www.cast-safety.org/pdf/3_engine_fundamentals.pdf (Year: 2012). 14 pages.
Espacenet, Patent Translate of DE202011051844, pp. 1-9, retrieved from Internet Apr. 11, 2018.
European Communication pursuant to Article 94(3) EPC, Application No. 18202156.8, dated Mar. 31, 2021. 6 pages.
European Patent Office, "Extended European Search Report" for EP application No. 18202156.8 mailed on Apr. 2, 2019, pp. 1-11.
European Patent Office, Extended European Search Report for Application No. 17175582.0, dated Nov. 9, 2017, pp. 1-5.
European Patent Office. "Extended European Search Report" for EP application No. 19181825.1, dated Oct. 30, 2019, pp. 1-7.
International Search Report and Written Opinion issued in App. No. PCT/US21/35115, mailing date Sep. 9, 2021, 19 pages.
International Search Report and Written Opinion, Application No. PCT/US2022/021540, mailed Jun. 24, 2022. 19 bages.
Office Action (Notice of Allowance and Fees Due (PTOL-85)) dated Sep. 8, 2022 for U.S. Appl. No. 17/331,997, pp. 1-5.
World Intellectual Property Organization, English Translation of CN 104149967, retrieved from Internet Oct. 4, 2019, pp. 1-4.
World Intellectual Property Organization, English Translation of CN 104176241, retrieved from Internet Oct. 2, 2019, pp. 1-7.
PCT International Search Report and Written Opinion, Application No. PCT/US22/35707, mailed Oct. 13, 2022.
Boeing, "About the Boeing 737 MAX", retrieved Online Sep. 14, 2022, URL: https://www.boeing.com/commercial/737max/ entire document.
Johnston, "Wing Flaps: How Do They Function and What Is Their Purpose?", retrieved Online Aug. 16, 2019, URL: https://calaero.edu/wing-flaps-function-and-purpose/#:~:text=Wing%20flaps%20change%20the%20shape,drag%20(used%20on%20landing entire document.
PCT International Search Report and Written Opinion, Application No. PCT/US23/82492, dated Apr. 8, 2024.
U.S. Office Action (Non-Final rejection), U.S. Appl. No. 18/085,946, dated May 22, 2024.
Great Britain Patents Act 1977: Examination Report under section 18(3), Application No. GB2400074.7, dated Jun. 24, 2024.

\* cited by examiner

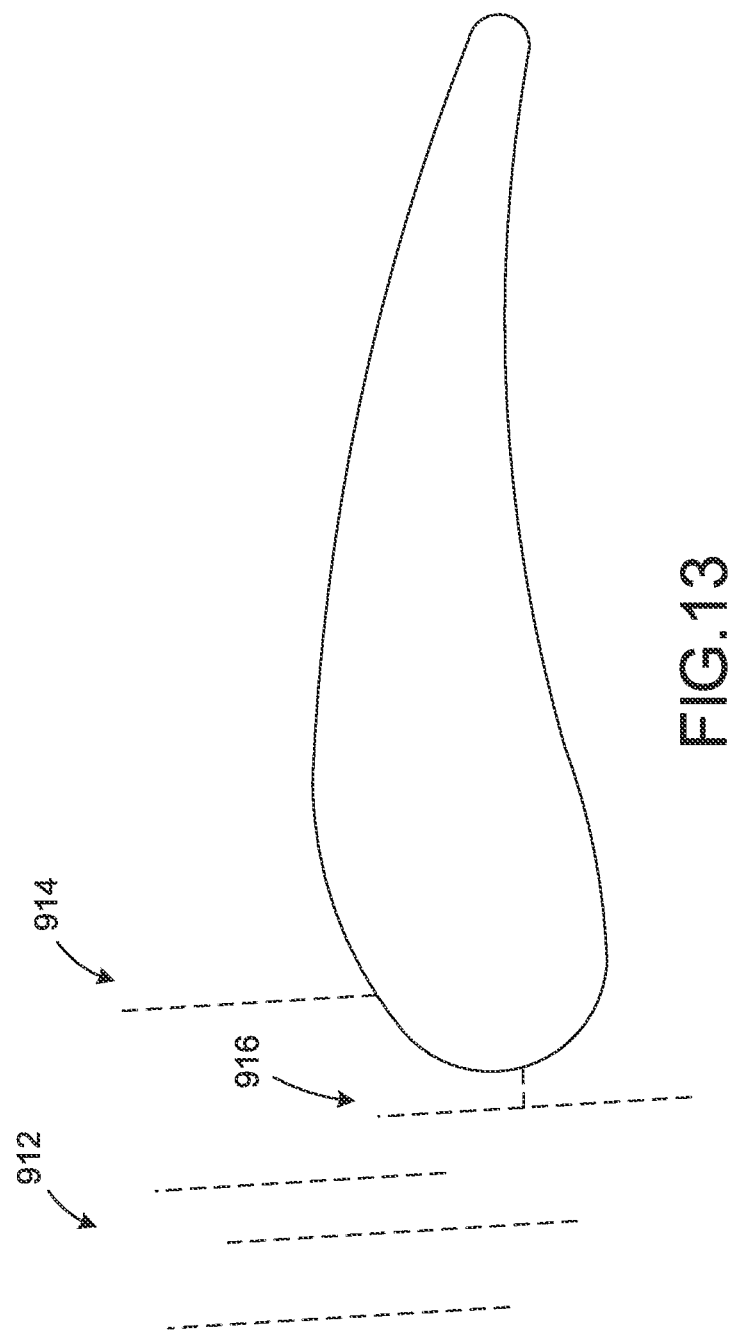

FLUID SYSTEMS HAVING A VARIABLE CONFIGURATION

CROSS REFERENCE TO RELATED APPLICATION

This application claims priority to U.S. Provisional Application No. 63/040,045, filed Jun. 17, 2020. The entire contents of this related application are hereby incorporated by reference into this disclosure.

FIELD

The disclosure relates generally to the field of fluid systems. More particularly, the disclosure relates to fluid systems that have a variable configuration.

BACKGROUND

Generally, airfoils are formed of two separate components, a wing and a flap. However, this structural arrangement makes it difficult to incorporate one or more channels that form a co-flow jet system, as described herein, that span both the wing and the flap.

Therefore, a need exists for new and useful fluid systems that have a variable configuration.

SUMMARY OF SELECTED EXAMPLE EMBODIMENTS

Various examples of fluid systems are described herein.

An example fluid system includes a body and a housing. The body has a leading edge, a trailing edge, a first portion, and a second portion. The second portion is attached to the first portion and is moveable relative to the first portion between a first position and a second position. The housing extends from the first portion to the second portion and is configured to move as the second portion moves relative to the first portion. The housing is moveable between a first configuration and a second configuration. The housing is in the first configuration when the second portion is in the first position. The housing is in the second configuration when the second portion is in the second position. The housing has a first length when in the first configuration and a second length when in the second configuration that is greater than the first length.

Another example fluid system includes a body, a housing, and a connector. The body has a leading edge, a trailing edge, a first portion, a second portion attached to the first portion, an injection opening disposed between the leading edge and the trailing edge, a suction opening disposed between the injection opening and the trailing edge, and a channel extending from the injection opening to the suction opening. The second portion is moveable relative to the first portion between a first position and a second position. The channel has a first portion extending from the suction opening to the housing and a second portion extending from the housing to the injection opening. The housing extends from the first portion to the second portion and is configured to move as the second portion moves relative to the first portion. The housing is disposed between the injection opening and the suction opening and is moveable between a first configuration and a second configuration. The housing is in the first configuration when the second portion is in the first position. The housing is in the second configuration when the second portion is in the second position. The housing has a first length when in the first configuration and a second length when in the second configuration that is greater than the first length. The connector is attached to the first portion and the second portion and fluidly connects the first portion of the channel to the second portion of the channel.

Additional understanding of the exemplary fluid systems that have a variable configuration can be obtained by review of the detailed description, below, and the appended drawings.

BRIEF DESCRIPTION OF THE DRAWINGS

FIG. 13 illustrates the various positions of one or more propulsion devices on an airfoil.

DETAILED DESCRIPTION

The following detailed description and the appended drawings describe and illustrate various example embodiments of fluid systems that have a variable configuration. The description and illustration of these examples are provided to enable one skilled in the art to make and use a fluid system that has a variable configuration. They are not intended to limit the scope of the claims in any manner.

Figure 1:
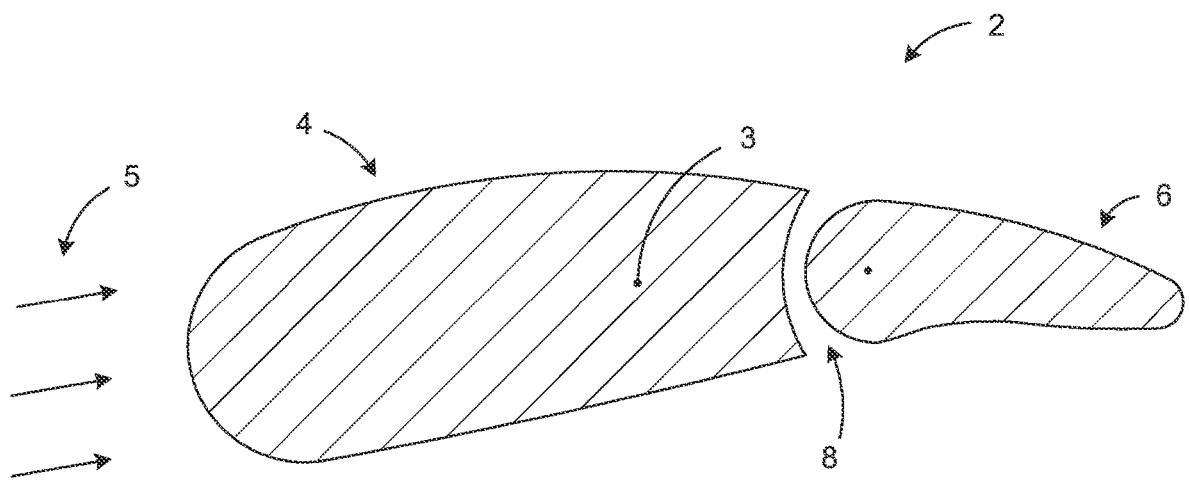
FIG. 1 is a cross-sectional view of a prior art airfoil taken along a plane that passes through the spanwise axis of the airfoil. The airfoil is in a first configuration.
Figure 2:
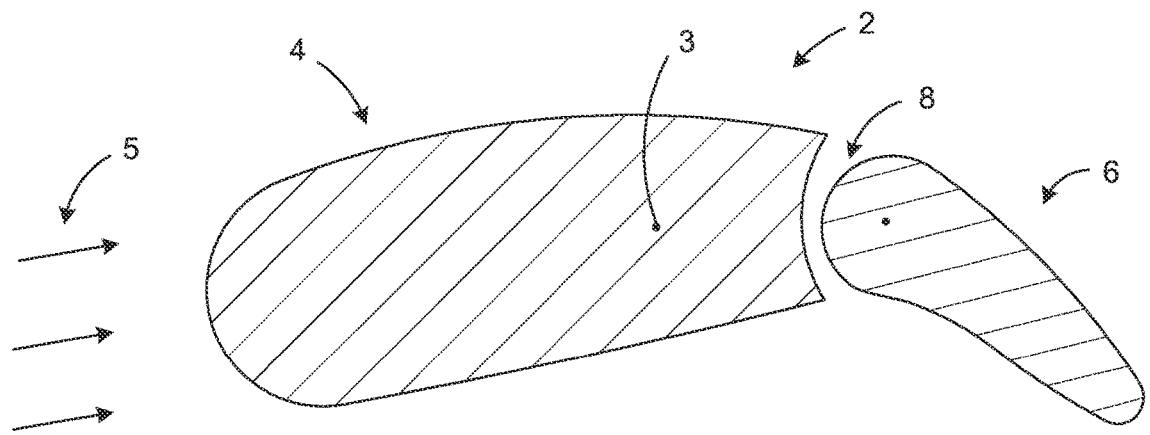
FIG. 2 is another view of the prior art airfoil illustrated in FIG. 1. The airfoil is in a second configuration.

FIGS. 1 and 2 illustrate a prior art airfoil 2 taken along a plane that passes through the spanwise axis 3 of the airfoil 2. The airfoil 2 has a wing 4, a flap 6, and is subjected to a fluid flow field 5. The airfoil 2 is moveable between a first configuration, as shown in FIG. 1, and a second configuration, as shown in FIG. 2. A space 8 is disposed between the wing 4 and the flap 6 preventing creation of one or more channels that span both the wing 4 and the flap 6.

FIGS. 3, 4, 5, and 6 illustrate an example fluid system 10. The fluid system 10 has a spanwise axis 11, a body 12, a chord length 13, and a housing 14.

Figure 3:
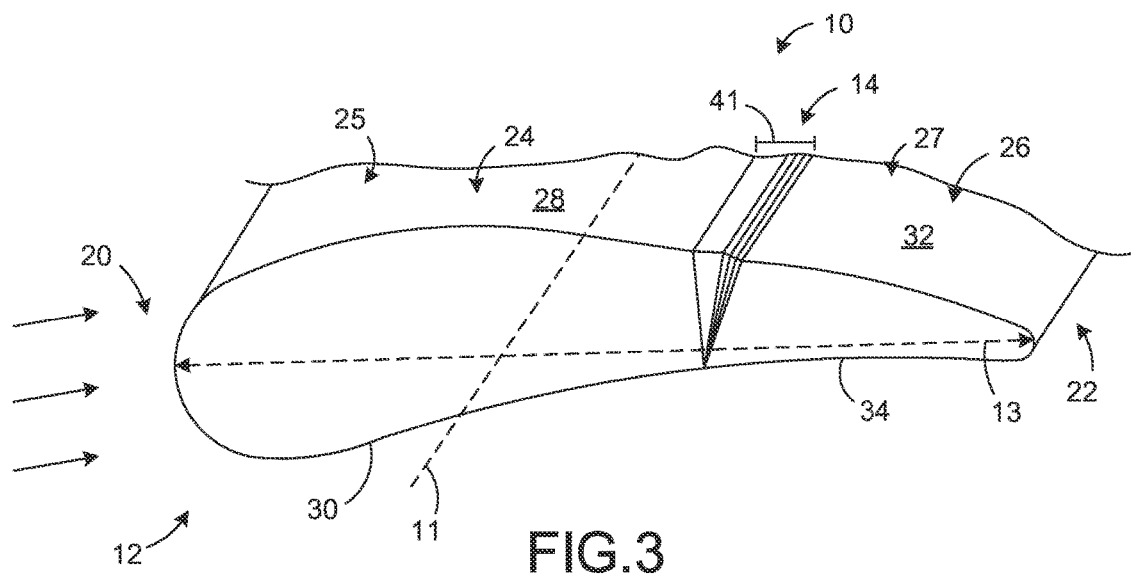
FIG. 3 is a partial perspective view of a first example fluid system subjected to a fluid flow field. The second portion is illustrated in the first position.
Figure 4:
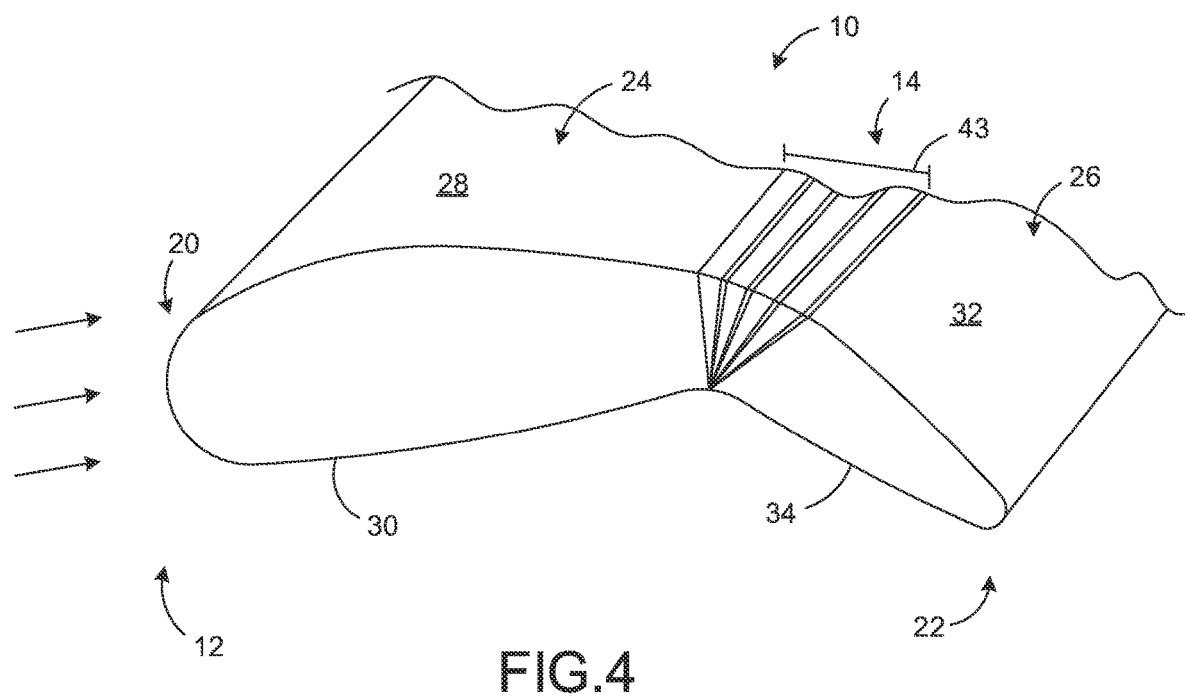
FIG. 4 is another partial perspective view of the fluid system illustrated in FIG. 3. The second portion is illustrated in the second position.
Figure 5:
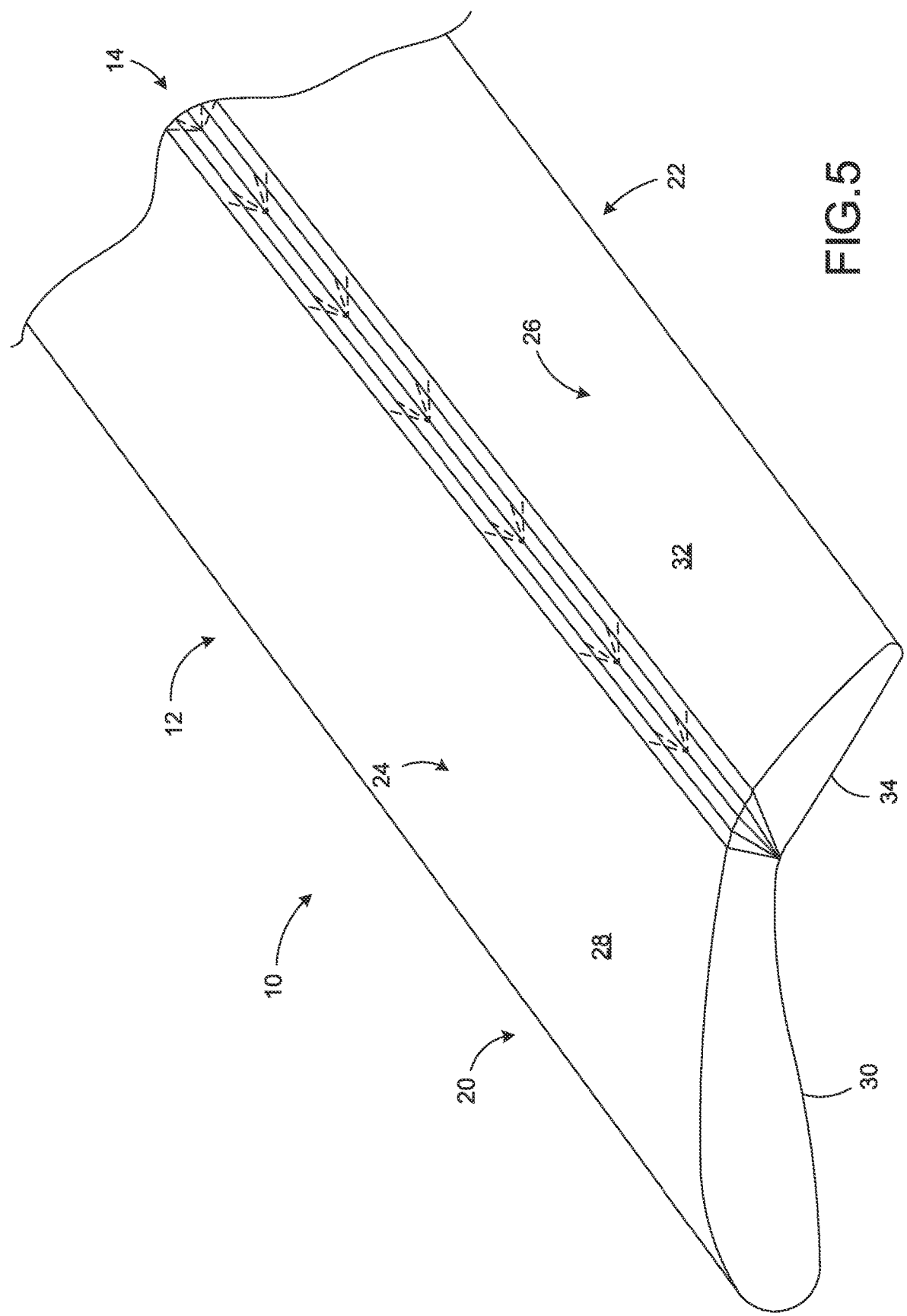
FIG. 5 is another partial perspective view of the fluid system illustrated in FIG. 3. The second portion is illustrated in the second position.

In the illustrated embodiment, the body 12 has a leading edge 20, a trailing edge 22, a first portion 24, and a second portion 26. The first portion 24 is illustrated as a wing 25 of an aircraft and has a top surface 28 and a bottom surface 30. The top surface 28 of the first portion 24 extends from the leading edge 20 toward the trailing edge 22. The bottom surface 30 of the first portion 24 extends from the leading edge 20 toward the trailing edge 22. The second portion 26 is illustrated as a flap 27 of an aircraft and has a top surface 32 and a bottom surface 34. The top surface 32 of the second portion 26 extends from the trailing edge 22 toward the leading edge 20. The bottom surface 34 of the second portion 26 extends from the trailing edge 22 toward the leading edge 20. The second portion 26 is pivotably attached to the first portion 24 and is moveable relative to the first portion between a first position, as shown in FIG. 3, and a second position, as shown in FIGS. 4, 5, and 6.

While the fluid system 10 has been illustrated as being incorporated on a wing 25 and flap 27 of an aircraft, a fluid system, such as those described herein can be incorporated into any suitable structure, such as wind turbine blades, or any other structure using an airfoil and that has a first portion and a second portion that is moveable relative to the first portion. While the second portion 26 has been illustrated as pivotably attached to the first portion 24, a second portion can be attached to a first portion using any suitable technique or method of attachment.

Figure 6:
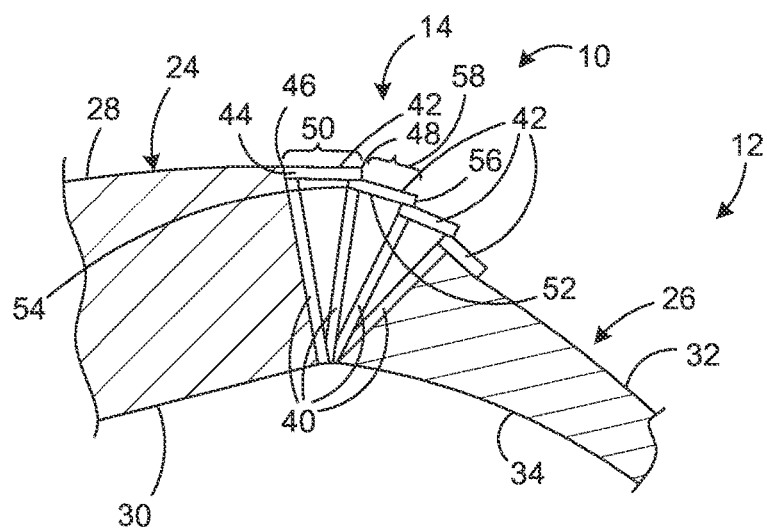
FIG. 6 is a cross-sectional view of the fluid system illustrated in FIG. 4 taken along a plane that passes through the spanwise axis of the airfoil.

In the illustrated embodiment, and as shown in FIG. 6, the housing 14 has a plurality of frame members 40, a plurality of plates 42, extends from the top surface 28 of the first portion 24 to the top surface 32 of the second portion 26, extends from the bottom surface 30 of the first portion 24 to the bottom surface 34 of the second portion 26, and is configured to move as the second portion 26 moves relative to the first portion 24. The housing 14 is moveable between a first configuration, as shown in FIG. 3, and a second configuration, as shown in FIGS. 4, 5, and 6. The housing 14 is in the first configuration when the second portion 26 is in the first position and the housing 14 in the second configuration when the second portion 26 is in the second position. The housing 14 has a first length 41 when in the first configuration and has a second length 43 that is greater than the first length 41 when in the second configuration. In some embodiments, one or more pieces of flexible material can be attached to a housing and a body, between one or more plates, between one or more frame members, and/or between one or more plates and the body to seal, or substantially seal, the attachment between the housing and the body such that air is prevented from entering the space between the housing and the body.

In the illustrated embodiment, the housing 14 is attached to both the first portion 24 and the second portion 26 between the leading edge 20 and the trailing edge 22, forms a substantially continuous surface from the top surface 28 of the first portion 24 to the top surface 32 of the second portion 26 when the housing 14 is in the first configuration and the second configuration, and forms a substantially continuous surface from the bottom surface 30 of the first portion 24 to the bottom surface 34 of the second portion 26 when the housing 14 is in the first configuration and the second configuration. However, in alternative embodiments, a housing could be attached to only the first portion or only the second portion. The housing 14 is pivotably attached to the first portion 24 and the second portion 26 at a location disposed along a hypothetical surface that extends from the bottom surface 30 of the first portion 24 to the bottom surface 34 of the second portion 26.

In the illustrated embodiment, each plate of the plurality of plates 42 is attached to a frame member of the plurality of frame members 40. The plurality of plates 42 is stacked when the second portion 26 is in the first configuration and the second configuration. A first plate 44 of the plurality of plates 42 has a first end 46, a second end 48, and a length 50 that extends from the first end 46 to the second end 48. A second plate 52 of the plurality of plates 42 has a first end 54, a second end 56, and a length 58 that extends from the first end 54 to the second end 56. When the second portion 26 is in the first configuration, the first end 54 of the second plate 52 is positioned adjacent the first end 46 of the first plate 44 (e.g., the first end 54 of the second plate 52 is disposed a first distance from second end 48 of the first plate 44). When the second portion 26 is in the second configuration, the second end 48 of the first plate 44 is positioned adjacent the first end 54 of the second plate 52 (e.g., the first end 54 of the second plate 52 is disposed a second distance from second end 48 of the first plate 44 that is less than the first distance).

While the housing 14 has been illustrated as being pivotably attached to both the first portion 24 and the second portion 26, a housing can be attached to a first portion and/or second portion using any suitable technique or method of attachment. While the housing has been illustrated as including a plurality of frame members and a plurality of plates, a housing can include any suitable structural elements, such as those described herein, or otherwise known or developed. Inclusion of a housing on a fluid system, such as an airfoil, provides a mechanism for substantially sealing, or closing, the space 8, as shown in FIGS. 1 and 2, increasing the efficiency of the fluid system.

Figure 7:
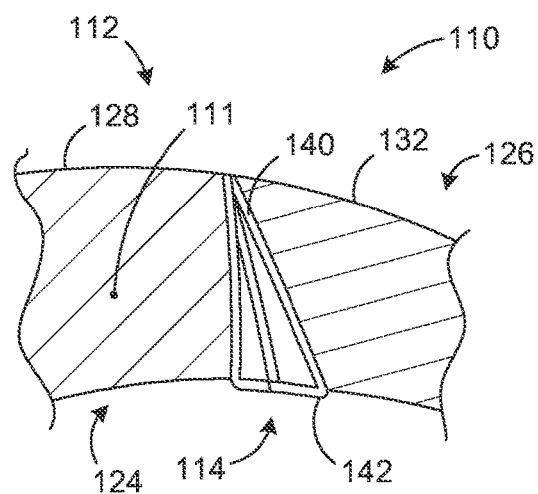
FIG. 7 is a cross-sectional view of a second example fluid system taken along a plane that passes through the spanwise axis of the airfoil. The second portion is illustrated in the first position.
Figure 8:
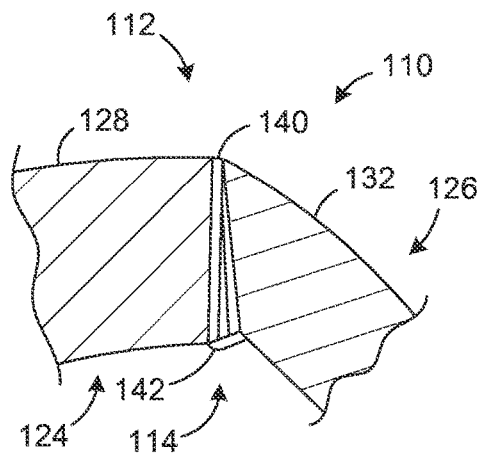
FIG. 8 illustrates the second portion of the fluid system illustrated in FIG. 7 in the second position.

FIGS. 7 and 8 illustrate another example fluid system 110. The fluid system 110 is similar to the fluid system 10 illustrated in FIGS. 3, 4, 5, and 6 and described above, except as detailed below. The fluid system 110 has a spanwise axis 111, a body 112, and a housing 114.

In the illustrated embodiment, the housing 114 comprises a plurality of frame members 140, a flexible material 142 attached to the frame members 140, and is pivotably attached to the first portion 124 and the second portion 126 at a location disposed along a hypothetical surface that extends from the top surface 128 of the first portion 124 to the top surface 132 of the second portion 126. A flexible member can comprise any suitable material having any suitable thickness and/or shape.

While the housing 114 has been illustrated as being pivotably attached to the first portion 124 and the second portion 126 at a location disposed along a hypothetical surface that extends from the top surface 128 of the first portion 124 to the top surface 132 of the second portion 126, alternative embodiments can include a housing that is attached to only a first portion, only a second portion, and/or at any suitable location on an airfoil. Examples of locations considered suitable to attach (e.g., pivotably, hingedly, moveably) a housing to a body (e.g., first portion, second portion, first portion and second portion) that has a first axis that extends from a leading edge to a trailing edge include at a location disposed between the first axis and a hypothetical surface that extends from the top surface of the first portion to the top surface of the second portion, at a location disposed between the first axis and a hypothetical surface that extends from the bottom surface of the first portion to the bottom surface of the second portion, and any other location considered suitable for a particular embodiment. In addition, one or more housings, frames, plates, and/or flexible members can be included along any suitable portion along the spanwise axis of a body (e.g., span of an airfoil).

Figure 9:
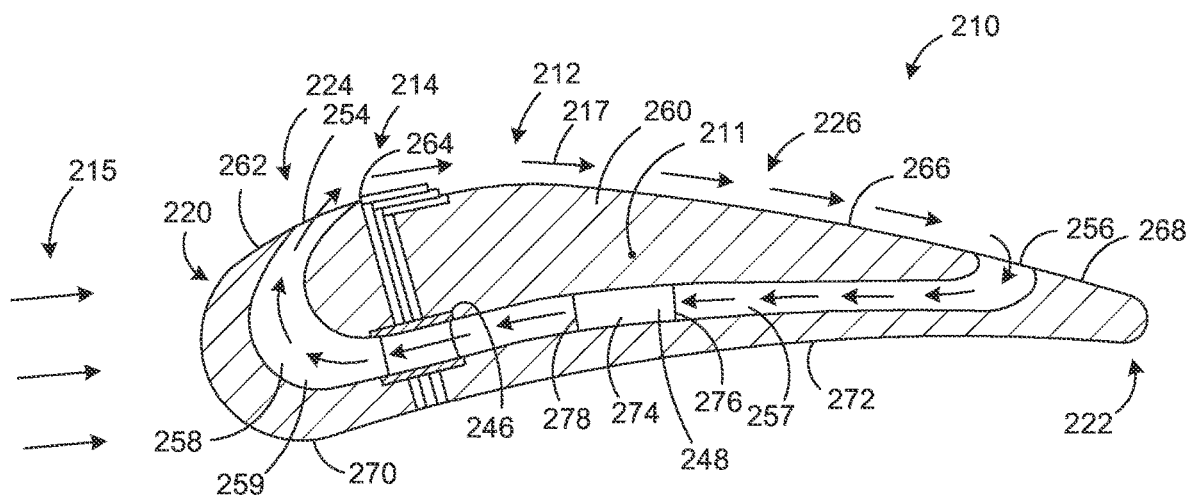
FIG. 9 is a cross-sectional view of a third example fluid system taken along a plane that passes through the spanwise axis of the airfoil. The second portion is illustrated in the first position.
Figure 10:
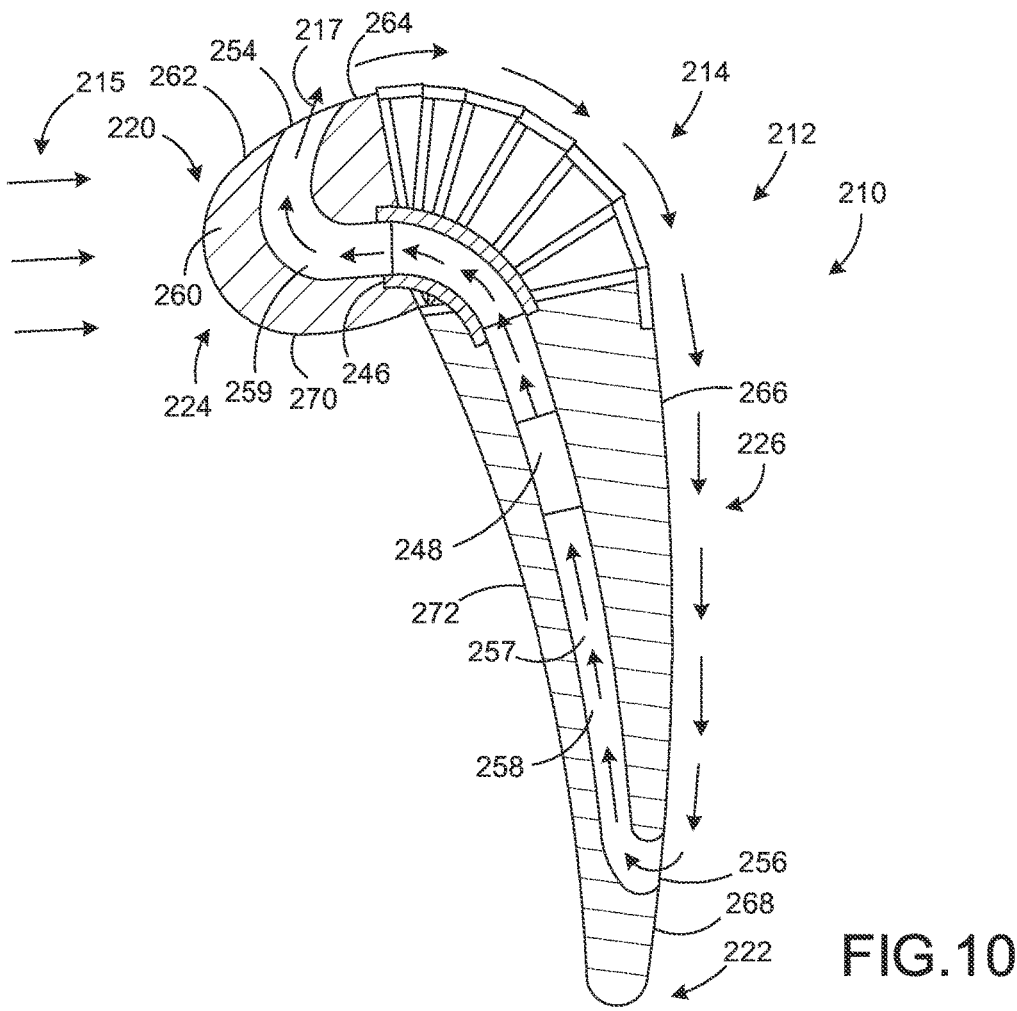
FIG. 10 illustrates the second portion of the fluid system illustrated in FIG. 9 in the second position.

FIGS. 9 and 10 illustrate another example fluid system 210. The fluid system 210 is similar to the fluid system 10 illustrated in FIGS. 3, 4, 5, and 6 and described above, except as detailed below. The fluid system 210 has a spanwise axis 211, a body 212, a housing 214, a connector 246, and a fluid pressurizer 248.

In the illustrated embodiment, the body 212 has a leading edge 220, a trailing edge 222, a first portion 224, a second portion 226, an injection opening 254, a suction opening 256, a channel 258, a wall 260, a front surface 262, a first intermediate surface 264, a second intermediate surface 266, a rear surface 268, a first bottom surface 270, and a second bottom surface 272. The injection opening 254 is disposed between the leading edge 220 and the trailing edge 222. In the illustrated embodiment, the injection opening 254 is disposed between the leading edge 220 and the housing 214. The suction opening 256 is disposed between the injection opening 254 and the trailing edge 222. In the illustrated embodiment, the suction opening 256 is disposed between the housing 214 and the trailing edge 222. The housing 214 is disposed between the injection opening 254 and the suction opening 256 and between the injection opening 254 and the fluid pressurizer 248. The channel 258 extends from the injection opening 254 to the suction opening 256 and has a first portion 257 and a second portion 259. The front surface 262 extends from the leading edge 220 to the injection opening 254. The first intermediate surface 264 extends from the injection opening 254 to the housing 214. The second intermediate surface 266 extends from the housing 214 to the suction opening 256. The rear surface 268 extends from the trailing edge 222 to the suction opening 256. The first bottom surface 270 extends from the leading edge 220 to the housing 214. The second bottom surface 272 extends from the housing 214 to the trailing edge 222.

In the illustrated embodiment, the first portion 257 of the channel 258 extends from the suction opening 256 to the housing 214 and the second portion 259 of the channel 258 extends from the housing 214 to the injection opening 254. The connector 246 extends from the first portion 257 of the channel 258 to the second portion 259 of the channel 258 and fluidly connects the first portion 257 of the channel 258 to the second portion 259 of the channel 258. In the illustrated embodiment, the connector 246 is a flexible member that is attached to the first portion 224 and the second portion 226, is configured to move with movement of the second portion 226 of the body 212 relative to the first portion 224 of the body 212, and is configured to seal, or substantially seal, the connection between the first portion 257 of the channel 258 and the second portion 259 of the channel 258. Any suitable flexible member can be used as a connector and selection of a flexible member can be based on various considerations, including the intended use of the fluid system. Examples of flexible members considered suitable as a connector include ducts, ducts that include a spring (e.g., that surrounds the duct, is disposed within the duct, and/or is embedded into the material forming the duct), and any other flexible member considered suitable for a particular embodiment. In the illustrated embodiment, the flexible member includes a duct and a spring.

While the injection opening 254 has been illustrated as being disposed between the leading edge 220 and the housing 214 and the suction opening 256 has been illustrated as being disposed between the housing 214 and the trailing edge 222, an injection opening and suction opening can be disposed at any suitable location on a body and/or housing and selection of a suitable location can be based on various considerations, including the intended use of the fluid system. Examples of locations considered suitable to position an injection opening and/or suction opening include between a leading edge and a housing (e.g., upstream of a housing), on a housing, between a housing and a trailing edge (e.g., downstream of a housing), and any other location considered suitable for a particular embodiment.

While the housing 214 has been illustrated as being disposed between the injection opening 254 and the suction opening 256, a housing can be disposed at any suitable location on a body and selection of a suitable location can be based on various considerations, including the intended use of the fluid system of which the housing is a component. Examples of locations considered suitable to position a housing include between a leading edge and an injection opening, between an injection opening and a suction opening, between a suction opening and a trailing edge, on a wing of an aircraft, on a flap of an aircraft, on both a wing and a flap of an aircraft, combinations of the locations described herein, and any other location considered suitable for a particular embodiment.

A body of a fluid system can have any suitable structural configuration and selection of a suitable structural configuration can be based on various considerations, including the intended use of a fluid system. For example, a body can be an integrated component or have a first body portion and a second body portion attached to the first body portion using a plurality of supports. In embodiments in which the body has first and second body portions, the first body portion and the second body portion can cooperatively define the channel. Examples of suitable structural configurations for a body, a first body portion, a second body portion, a plurality of supports, and other elements, features, and/or components that can be included in a fluid system described herein include those illustrated and described in U.S. patent application Ser. No. 15/426,084 by Zha and filed on Feb. 7, 2017, which is incorporated by reference herein in its entirety, U.S. patent application Ser. No. 15/255,523 by Zha and filed on Sep. 2, 2016, which is incorporated by reference herein in its entirety, U.S. patent application Ser. No. 16/135,120 by Zha and filed on Sep. 19, 2018, which is incorporated by reference herein in its entirety, U.S. patent application Ser. No. 16/445,822 by Zha and filed on Jun. 19, 2019, which is incorporated by reference herein in its entirety, U.S. patent application Ser. No. 16/252,943 by Zha and filed on Jan. 21, 2019, which is incorporated by reference herein in its entirety, and/or U.S. Provisional Patent Application No. 62/877,335 by Zha and filed on Jul. 23, 2019, which is incorporated by reference herein in its entirety.

As shown in FIG. 9, a fluid flow field 215 interacts with the fluid system 210 such that the fluid, which in this example is air, travels around, and through, the fluid system 210. The fluid travels into the suction opening 256, travels through the channel 258, exits at the injection opening 254, and is injected into the fluid flow as a jet 217 over the top of the body 212. In the illustrated embodiment, the jet 217 of fluid is substantially tangential to the first intermediate surface 264 of the body 212 downstream of the injection opening 254. The jet 217 is considered a co-flow jet in that it forms a stream of fluid that is injected into a separate fluid, or fluid flow. However, alternative embodiments can include one or more jets that are not tangential to an intermediate surface of a main body.

In the illustrated embodiment, the fluid pressurizer 248 is disposed within the channel 258 and is in communication with the injection opening 254 and the suction opening 256. The fluid pressurizer 248 is moveable between an off state and an on state and comprises a pump 274, a suction port 276, and a discharge port 278. The inclusion of a fluid pressurizer 248 provides a mechanism for pressurizing fluid passing through channel 258 and forming one or more jets 217 as the fluid exits the injection opening 254. A fluid pressurizer 248, such as pump 274, can be operatively connected to any suitable portion of the device, system, or component on which the fluid system is disposed to provide power to the fluid pressurizer 248 (e.g., battery, electric motor) and/or to provide a mechanism for moving the fluid pressurizer 248 between the off state and the on state (e.g., one or more switches). Alternative embodiments can include a fluid pressurizer that can vary the degree to which fluid is pressurized through the channel 258.

In the illustrated embodiment, the fluid pressurizer 248 is attached to the body 212 and is positioned such that the suction port 276 is directed toward the first portion 257 of the channel 258 that extends from the suction opening 256 to the pump 274 (e.g., the suction port 276 is directed toward the suction opening 256) and the discharge port 278 is directed toward the second portion 259 of the channel 258 that extends from the injection opening 254 to the pump 274 (e.g., the discharge port 278 is directed toward the injection opening 254). In the off state, the pump 274 does not draw any fluid through the channel 258. In the on state, the pump 274 draws fluid through the suction opening 256, through the channel 258 and pump 274, and pushes fluid out of the injection opening 254.

While the fluid pressurizer 248 has been illustrated as being disposed between the housing 214 and the suction opening 256, a fluid pressurizer can be disposed at any suitable location on a body and/or housing and selection of a suitable location can be based on various considerations, including the intended use of the fluid system. Examples of locations considered suitable to position a fluid pressurizer include between an injection opening and a housing, on a housing, between a housing and a suction opening, and any other location considered suitable for a particular embodiment.

A fluid pressurizer can be attached to a body using any suitable technique or method of attachment and selection of a suitable technique or method of attachment between a fluid pressurizer and a body can be based on various considerations, including the material(s) that forms the fluid pressurizer and/or the main body. Example techniques and methods of attachment considered suitable include welding, fusing, using adhesives, mechanical connectors, and any other technique or method considered suitable for a particular embodiment. In the illustrated embodiment, the fluid pressurizer 248 is fastened to the body 212 using mechanical connectors (e.g., screws, bolts).

Figure 11:
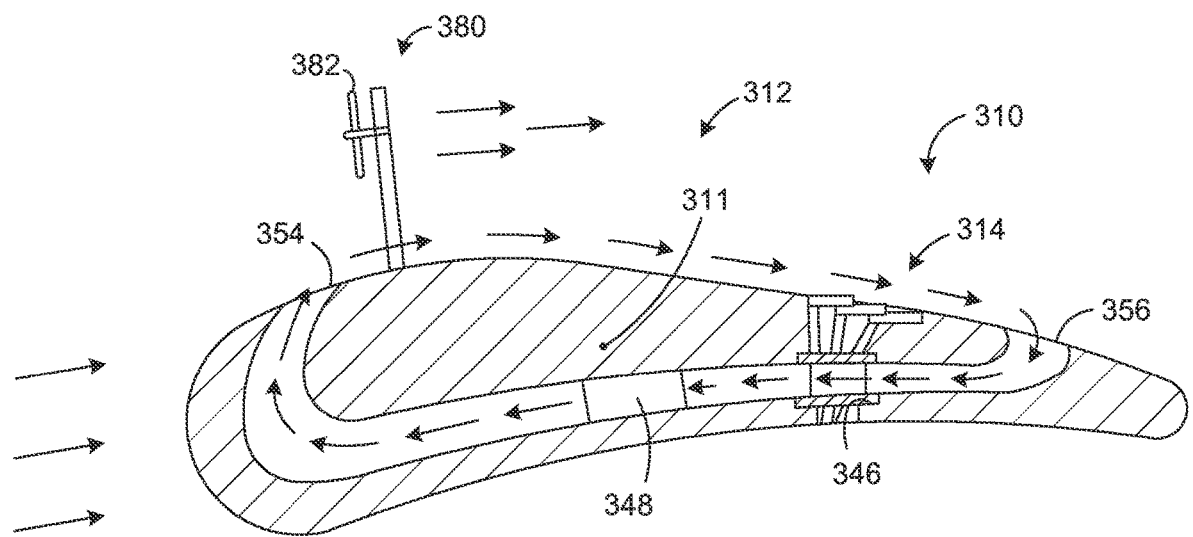
FIG. 11 is a cross-sectional view of a fourth example fluid system taken along a plane that passes through the spanwise axis of the airfoil. The second portion is illustrated in the first position.
Figure 12:
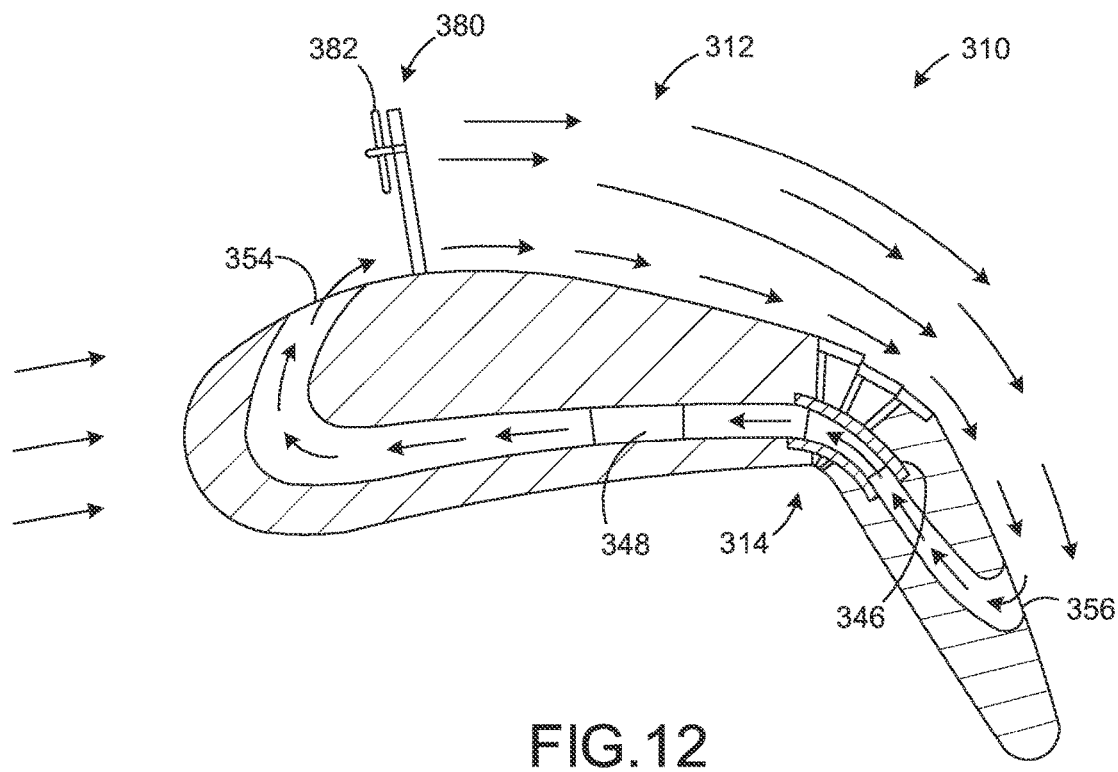
FIG. 12 illustrates the second portion of the fluid system illustrated in FIG. 11 in the second position.

FIGS. 11 and 12 illustrate another example fluid system 310. The fluid system 310 is similar to the fluid system 210 illustrated in FIGS. 9 and 10 and described above, except as detailed below. The fluid system 310 has a spanwise axis 311, a body 312, a housing 314, a connector 346, a fluid pressurizer 348, and a propulsion device 380.

In the illustrated embodiment, the injection opening 354 is disposed on the wing, the suction opening 356 is disposed on the flap, and the housing 314 is disposed between the injection opening 354 and the suction opening 356 and between the fluid pressurizer 348 and the suction opening 356.

The propulsion device 380 is disposed between the injection opening 354 and the suction opening 356 and comprises a propeller 382. While the fluid system 310 has been illustrated as including a propeller located at specific location on an airfoil, a fluid system can include any suitable number and type of propulsion devices positioned at any suitable location on an airfoil. Selection of a suitable number and type of propulsion devices, and position to locate a propulsion device, can be based on various considerations, including the intended use of the airfoil on which the fluid system is included. Examples of suitable propulsion devices considered suitable to include in a fluid system include propellers, jet engines, unducted fans, ducted fans, open rotors, any device of system that generates thrust, and any other propulsion device considered suitable for a particular embodiment. Examples of positions considered suitable to locate a propulsion device on a wing include between a tip of an aircraft and a leading edge of a wing (e.g., upstream of a leading edge), as illustrated by 912 in FIG. 13, between a leading edge and a trailing edge of a wing, as illustrated by 914 in FIG. 13, between a trailing edge of a wing and a tail of an aircraft, at the tip of a wing, as illustrated by 916 in FIG. 13, at an end of wing, between an injection opening and a suction opening, between a leading edge and an injection opening, between a suction opening and a trailing edge, such that each propulsion device in a plurality of propulsion devices is equally spaced from an adjacent propulsion device of the plurality of propulsion devices, such that each propulsion device in a plurality of propulsion devices is distributed along a wing (e.g., equally spaced, or variably spaced), such that the tip or outer perimeter of the propulsion device is spaced relative to the outer surface of a wing between about 0.01% of the wing chord length and about 100% of the wing chord length taken along a plane that is vertical, such that the tip or outer perimeter of the propulsion device is spaced relative to the outer surface of a wing between about 1% of the wing chord length and about 10% of the wing chord length taken along a plane that is vertical, such that a propulsion device is in front of the leading edge of a wing (e.g., between the leading edge and the nose, in front of the leading edge and nose), at a leading edge, at a trailing edge, and any other location considered suitable for a particular embodiment. Examples of numbers of propulsion devices considered suitable to include on a wing include zero, one, at least one, two, a plurality, three, four, five, six, seven, eight, more than eight, and any other number considered suitable for a particular embodiment. The inclusion of one or more propulsion devices in a fluid system, such as those described herein, increases the lift, increases the efficiency, and reduces the noise relative to conventional direct vertical takeoff and landing vehicles.

A body, a housing, a fluid pressurizer, and any other feature, element, or component described herein and included in a fluid system can be formed of any suitable material and manufactured using any suitable technique. Selection of a suitable material to form a body, a housing, a fluid pressurizer, and any other feature, element, or component described herein and included in a fluid system and a suitable technique to manufacture a body, a housing, a fluid pressurizer, and any other feature, element, or component described herein and included in a fluid system can be based on various considerations, including the intended use of the fluid system. Example materials considered suitable to form a body, a housing, a fluid pressurizer, and/or any other feature, element, or component described herein include conventional materials, metals, steel, aluminum, alloys, plastics, combinations of metals and plastics, composite materials, and any other material considered suitable for a particular embodiment. Example methods of manufacture considered suitable to manufacture a body, a housing, a fluid pressurizer, and/or any other feature, element, or component described herein include convention methods and techniques, injection molding, machining, 3D printing, and/or any other method or technique considered suitable for a particular embodiment. While the various features, elements, and components described herein and included in a fluid system have been illustrated as having a particular structural configuration, any feature, element, or component described herein and included in a fluid system can have any suitable structural arrangement. Selection of a suitable structural arrangement for a feature, element, or component described herein and included in a fluid system can be based on various considerations, including the intended use of the fluid system.

The embodiments described herein can be included on an airfoil of a wing of an aircraft capable of traveling at any suitable speed, including subsonic (e.g., between about Mach 0.6 and about Mach 0.95) and supersonic. When included on aircraft that will be completing transonic flights, or on aircrafts in which a shock wave may be created on the upper surface of the airfoil, an injection opening and/or suction opening can be disposed downstream from where a shock wave may be created, or between the trailing edge and where the shock wave may be created.

While the example fluid systems described herein have been illustrated as being included on a wing of an aircraft that has a constant chord length with no sweep angle, a fluid system, such as those described herein can be included in any suitable structure, device, and/or system. Selection of a suitable structure, device, and/or system to include a fluid system can be based on various considerations, such as the intended use of the structure, device, and/or system. Examples of structures, devices, and/or systems considered suitable to include a fluid system, such as those described herein, include aircraft, unmanned reconnaissance aircrafts, small person aircrafts, commercial airlines, wings of aircrafts, wings of aircrafts that have a varying chord length and/or sweep angle, wings of aircraft that are tapered, space shuttles, space exploratory aircrafts, exploratory aircrafts, airplanes, helicopters, rotorcraft rotor blades, vehicles, automobiles, cars, trucks, motorcycles, boats, locomotives, projectiles, turbines, wind turbines, blades of wind turbines, gas turbine engines, gas turbine engine compressors and/or fans, pumps, propellers, blades, sails, any structure, device, and/or system that uses airfoils, land vehicles, water vehicles, air vehicles, any structure, device, and/or system that is used to generate lift and/or thrust, and any other structure, device, and/or system considered suitable. For example, the fluid systems described herein can be used for exploratory missions to other planets, such as flights in the Martian atmosphere. The inclusion of a fluid system in these example embodiments reduce energy consumption, enhance lift, reduce drag, generate thrust, increase cruise aerodynamic efficiency, enhance maneuverability and safety, and reduce take off/landing distance required for structures, devices, and/or systems that include a fluid system, such as those described herein. Any of the embodiments described herein can include any suitable component of a conventional wing of an aircraft. For example, any of the embodiments described herein can include a flap and/or elevator (e.g., which can be moveable relative to the first body portion) that provides enhanced lift to the wing during flight.

Any of the herein described examples of fluid systems, and any of the features described relative to a particular example of a fluid system, can be included along a portion, or the entirety, of the span of a wing, blade, or other feature of a device, system, component (e.g., transportation vehicle) in which it is desired to include a fluid system.

Those with ordinary skill in the art will appreciate that various modifications and alternatives for the described and illustrated embodiments can be developed in light of the overall teachings of the disclosure, and that the various elements and features of one example described and illustrated herein can be combined with various elements and features of another example without departing from the scope of the invention. Accordingly, the particular examples disclosed herein have been selected by the inventor(s) simply to describe and illustrate examples of the invention and are not intended to limit the scope of the invention or its protection, which is to be given the full breadth of the appended claims and any and all equivalents thereof.

What is claimed is:

1. A fluid system comprising:
    a body having a leading edge, a trailing edge, a first portion, a second portion attached to the first portion and moveable relative to the first portion between a first position and a second position, an injection opening disposed adjacent to the leading edge and between the leading edge and the trailing edge, a suction opening disposed between the injection opening and the trailing edge, and a channel extending from the injection opening to the suction opening, the suction opening disposed on the second portion of the body; and
    a housing extending from the first portion to the second portion and configured to move as the second portion moves relative to the first portion, the housing moveable between a first configuration and a second configuration, the housing in the first configuration when the second portion is in the first position, the housing in the second configuration when the second portion is in the second position, the housing having a first length when in the first configuration and a second length when in the second configuration that is greater than the first length.

2. The fluid system of claim 1, wherein the first portion is a wing of an aircraft.

3. The fluid system of claim 2, wherein the second portion is a flap of an aircraft.

4. The fluid system of claim 1, wherein the housing is attached to the first portion.

5. The fluid system of claim 1, wherein the housing is attached to the second portion.

6. The fluid system of claim 1, wherein the first portion has a top surface extending from the leading edge toward the trailing edge;
    wherein the second portion has a top surface extending from the trailing edge toward the leading edge; and
    wherein the housing extends from the top surface of the first portion to the top surface of the second portion.

7. The fluid system of claim 1, wherein the first portion has a bottom surface extending from the leading edge toward the trailing edge;
    wherein the second portion has a bottom surface extending from the trailing edge toward the leading edge; and
    wherein the housing extends from the bottom surface of the first portion to the bottom surface of the second portion.

8. The fluid system of claim 1, wherein the housing comprises a plurality of frame members and a plurality of plates, each plate of the plurality of plates attached to a frame member of the plurality of frame members.

9. The fluid system of claim 8, wherein the first portion has a top surface extending from the leading edge toward the trailing edge;
wherein the second portion has a top surface extending from the trailing edge toward the leading edge; and
wherein the plurality of plates is stacked from the top surface of the first portion to the top surface of the second portion when the second portion is in the first position.

10. The fluid system of claim 8, wherein a first plate of the plurality of plates has a first end, a second end, and a length extending from the first end of the first plate to the second end of the first plate;
wherein a second plate of the plurality of plates has a first end, a second end, and a length extending from the first end of the second plate to the second end of the second plate; and
wherein the second end of the first plate is positioned adjacent the first end of the second plate of the plurality of plates when the second portion is in the second position.

11. The fluid system of claim 1, wherein the housing comprises a plurality of frame members and a flexible material attached to the frame members.

12. The fluid system of claim 1, wherein the housing is disposed between the injection opening and the suction opening.

13. The fluid system of claim 12, wherein the channel has a first portion extending from the suction opening to the housing and a second portion extending from the housing to the injection opening;
further comprising a connector attached to the first portion of the body and the second portion of the body, the connector fluidly connecting the first portion of the channel to the second portion of the channel.

14. The fluid system of claim 13, wherein the connector is a flexible member.

15. The fluid system of claim 1, further comprising a fluid pressurizer disposed within the channel.

16. The fluid system of claim 15, wherein the housing is disposed between the fluid pressurizer and the suction opening.

17. The fluid system of claim 1, further comprising a propulsion device.

18. A fluid system comprising:
a body having a leading edge, a trailing edge, a first portion, a second portion attached to the first portion and moveable relative to the first portion between a first position and a second position, an injection opening disposed adjacent to the leading edge and between the leading edge and the trailing edge, a suction opening disposed between the injection opening and the trailing edge, and a channel extending from the injection opening to the suction opening, the suction opening disposed on the second portion of the body;
a housing extending from the first portion to the second portion and configured to move as the second portion moves relative to the first portion, the housing attached to the first portion and the second portion, the housing disposed between the injection opening and the suction opening and moveable between a first configuration and a second configuration, the housing in the first configuration when the second portion is in the first position, the housing in the second configuration when the second portion is in the second position, the housing having a first length when in the first configuration, the housing having a second length when in the second configuration that is greater than the first length; and
a connector attached to the first portion and the second portion;
wherein the channel has a first portion extending from the suction opening to the housing and a second portion extending from the housing to the injection opening; and
wherein the connector fluidly connects the first portion of the channel to the second portion of the channel.

19. A fluid system comprising:
a body having a leading edge, a trailing edge, a first portion, a second portion attached to the first portion and moveable relative to the first portion between a first position and a second position, an injection opening disposed adjacent to the leading edge and between the leading edge and the trailing edge, a suction opening disposed adjacent to the trailing edge and between the injection opening and the trailing edge, and a channel extending from the injection opening to the suction opening, the suction opening disposed on the second portion of the body;
a housing extending from the first portion to the second portion and configured to move as the second portion moves relative to the first portion, the housing attached to the first portion and the second portion, the housing disposed between the injection opening and the suction opening and moveable between a first configuration and a second configuration, the housing in the first configuration when the second portion is in the first position, the housing in the second configuration when the second portion is in the second position, the housing having a first length when in the first configuration, the housing having a second length when in the second configuration that is greater than the first length;
a connector attached to the first portion and the second portion; and
a fluid pressurizer disposed within the channel and disposed between the housing and the injection opening;
wherein the channel has a first portion extending from the suction opening to the housing and a second portion extending from the housing to the injection opening; and
wherein the connector fluidly connects the first portion of the channel to the second portion of the channel.

\* \* \* \* \*